G. H. MORRIS.
INSULATING SUPPORT FOR STORAGE BATTERY TANKS.
APPLICATION FILED NOV. 7, 1910.

1,034,394.

Patented July 30, 1912.

WITNESSES:

INVENTOR
George H. Morris
BY
Augustus B. Stoughton
ATTORNEY.

UNITED STATES PATENT OFFICE.

GEORGE H. MORRIS, OF GLENCOE, ILLINOIS, ASSIGNOR TO THE ELECTRIC STORAGE BATTERY COMPANY, OF PHILADELPHIA, PENNSYLVANIA, A CORPORATION OF NEW JERSEY.

INSULATING-SUPPORT FOR STORAGE-BATTERY TANKS.

1,034,394.  Specification of Letters Patent.  Patented July 30, 1912.

Application filed November 7, 1910. Serial No. 591,017.

*To all whom it may concern:*

Be it known that I, GEORGE H. MORRIS, a citizen of the United States, residing at Glencoe, Cook county, Illinois, have invented a certain new and useful Insulating-Support for Storage-Battery Tanks, of which the following is a specification.

Objects of the present invention are to insure an even bearing between the glass or porcelain part of the support and the tank; to exclude dust and spray or moisture such as is incident to washing or scrubbing the floor from the insulating liquid contained in the glass or porcelain part; and to provide a conveniently assembled, efficient and durable insulating support.

The invention will be claimed at the end hereof and will be first described in connection with the embodiment of it selected for the sake of illustration in the accompanying drawings in which—

Figure 1:
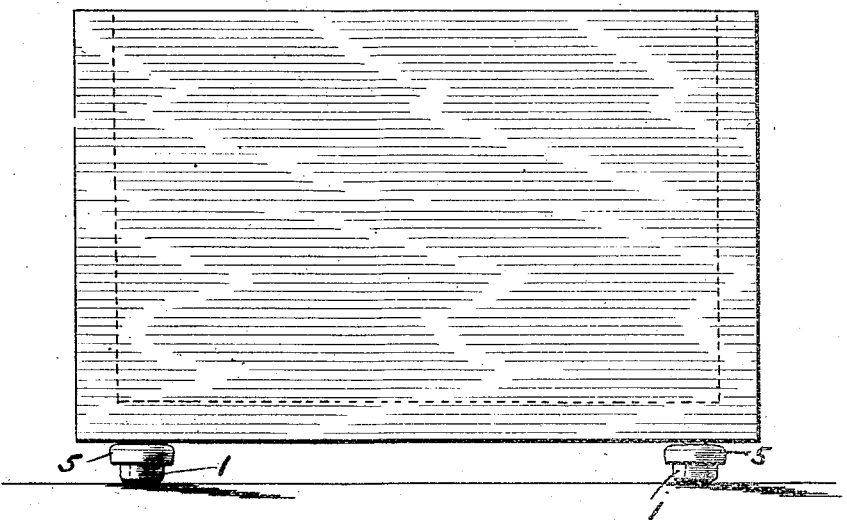
Figure 2:
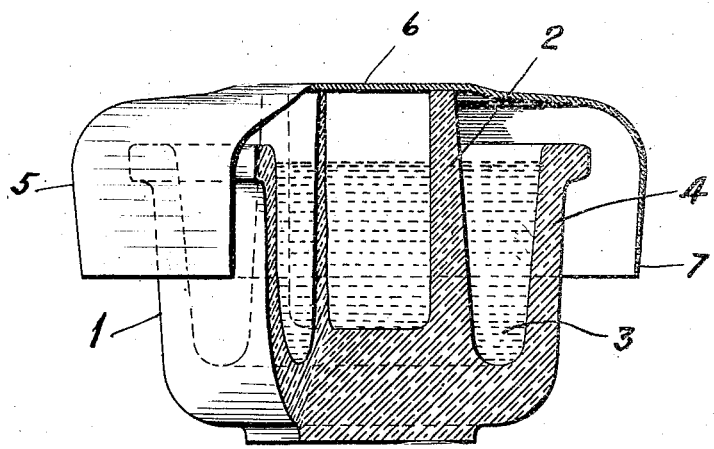

Figure 1, is an elevational view showing an insulating support embodying features of the invention in application to a storage battery tank, and Fig. 2, is an elevational view with parts broken away and drawn to an enlarged scale and illustrating a device embodying features of the invention.

In the drawings 1, is the glass or porcelain part or body of the device and in hereafter referring to this part as of glass that term is intended to include porcelain. The glass part or body 1, is provided with an upwardly extending centrally arranged supporting core 2, which may be tubular. Around this core is formed a receptacle 3, which contains an insulating fluid or substance as oil. The rim portion 4, of the body which with the tubular core forms the receptacle 3, does not extend as far as the core.

5, is a cap provided with a seat portion 6, which rests on top of the core 2, and with a depending flange or skirt 7, which extends below the rim part 4 of the body 1. The seat portion 6, may be made thicker than the rest of the cap and it may be somewhat offset so as to operate as a guide in centering the cap in respect to the body. The cap is made of soft metal such as lead or an alloy of lead.

In use the central or seat portion 6, of the cap since it is of soft metal, yields or slightly flows under the weight of the tank and thus distributes the weight evenly on the top of the tubular core so that breakage of the latter is avoided, it being remembered that the core is of glass or porcelain and therefore should be evenly loaded. The depending skirt or flange operates as a guard and keeps out dust and moisture such as might enter the liquid receptacle 3, when the floor is brushed or washed.

What I claim is:

1. An insulating support for storage battery tanks comprising the combination of a glass body having a supporting core and a chamber for insulating fluid, and a cap of soft metal seated on the core to distribute weight evenly thereon and provided with a flange or skirt depending below the wall of said receptacle and constituting a guard for excluding dust and extraneous matter, substantially as described.

2. An insulating support for storage battery tanks comprising the combination of a glass receptacle having a supporting core, and a soft metal cap provided with a seat adapted to overlie the core and with a flange or skirt depending around the receptacle, substantially as described.

3. An insulating support for storage battery tanks comprising an insulating liquid receptacle member having a supporting core and a cap member provided with a flange or skirt depending around the receptacle member, and yielding means at the contact of the two members, substantially as described.

4. An insulating support for storage battery tanks comprising an insulating liquid receptacle having a supporting core of rigid material and a cap provided with a seat of yielding material adapted to overlie the core and with a flange or skirt depending around the receptacle substantially as described.

In testimony whereof I have hereunto signed my name.

GEORGE H. MORRIS.

Witnesses:
TALLOFERRO NUTTON,
BRUCE FORD.

Copies of this patent may be obtained for five cents each, by addressing the "Commissioner of Patents, Washington, D. C."